(12) United States Patent  
Deguchi et al.

(10) Patent No.: US 10,976,240 B2  
(45) Date of Patent: Apr. 13, 2021

(54) CONCENTRATION MEASUREMENT DEVICE

(71) Applicants: TOKUSHIMA UNIVERSITY, Tokushima (JP); FUJIKIN INCORPORATED, Osaka (JP)

(72) Inventors: Yoshihiro Deguchi, Tokushima (JP); Masaaki Nagase, Osaka (JP); Michio Yamaji, Osaka (JP); Nobukazu Ikeda, Osaka (JP); Kouji Nishino, Osaka (JP); Masayoshi Kawashima, Osaka (JP); Kazuteru Tanaka, Osaka (JP)

(73) Assignees: TOKUSHIMA UNIVERSITY, Tokushima (JP); FUJIKIN INCORPORATED, Osaka (JP)

( * ) Notice: Subject to any disclaimer, the term of this patent is extended or adjusted under 35 U.S.C. 154(b) by 0 days.

(21) Appl. No.: 15/748,264

(22) PCT Filed: Aug. 9, 2016

(86) PCT No.: PCT/JP2016/003669  
§ 371 (c)(1),  
(2) Date: Jan. 29, 2018

(87) PCT Pub. No.: WO2017/029792  
PCT Pub. Date: Feb. 23, 2017

(65) Prior Publication Data  
US 2018/0217054 A1  Aug. 2, 2018

(30) Foreign Application Priority Data

Aug. 18, 2015  (JP) .............................. JP2015-161233

(51) Int. Cl.  
*G01N 21/94* (2006.01)  
*G01N 21/31* (2006.01)  
(Continued)

(52) U.S. Cl.  
CPC ............. *G01N 21/3103* (2013.01); *G01J 3/10* (2013.01); *G01J 3/42* (2013.01); *G01N 21/274* (2013.01);  
(Continued)

(58) Field of Classification Search  
CPC ........... G01N 21/274; G01N 2021/311; G01N 21/314; G01N 21/3151; G01N 2021/558;  
(Continued)

(56) References Cited

U.S. PATENT DOCUMENTS 5,396,325 A * 3/1995 Carome ............... G01N 21/552  
356/128  
5,774,213 A * 6/1998 Trebino ............. G01N 21/3151  
356/320

(Continued)

FOREIGN PATENT DOCUMENTS

EP  3051274 A1  8/2016  
JP  54-028683 A  3/1979  
(Continued)

OTHER PUBLICATIONS

Hodgkinson, Masiyano, and Tatam "Gas cells for tunable diode laser absorption spectrscopy employing optical diffusers. Part 1: Single and dual pass cells.", Applied Physics B 100 (2), 291-302, 2010 Special issue. (Year: 2010).*

(Continued)

*Primary Examiner* — Rebecca C Bryant  
(74) *Attorney, Agent, or Firm* — Studebaker & Brackett PC (57) ABSTRACT

A concentration measurement device for measuring the concentration of a measured fluid within a measurement cell by detecting transmitted light that has passed through the measurement cell having a light incidence window and a light emission window disposed opposing to each other, (Continued)

comprising a reflected-light detector for detecting reflected light of the light incidence window.

11 Claims, 5 Drawing Sheets

(51) Int. Cl.
    *G01N 21/33*     (2006.01)
    *G01N 21/27*     (2006.01)
    *G01J 3/10*     (2006.01)
    *G01J 3/42*     (2006.01)
    *G01N 21/59*     (2006.01)
    *G01N 21/15*     (2006.01)
    *G01N 21/55*     (2014.01)
    *G01N 21/88*     (2006.01)

(52) U.S. Cl.
    CPC ............ *G01N 21/33* (2013.01); *G01N 21/59* (2013.01); *G01N 21/94* (2013.01); *G01N 21/88* (2013.01); *G01N 2021/157* (2013.01); *G01N 2021/3133* (2013.01); *G01N 2021/558* (2013.01); *G01N 2201/0627* (2013.01); *G01N 2201/08* (2013.01)

(58) Field of Classification Search
    CPC ... G01N 21/88; G01N 21/94; G01N 2021/945
    See application file for complete search history.

(56) References Cited

U.S. PATENT DOCUMENTS

| | | | | |
|---|---|---|---|---|
| 5,812,270 | A * | 9/1998 | Hampton | G01B 11/00 356/237.1 |
| 5,897,378 | A | 4/1999 | Eriguchi | |
| 6,331,704 | B1 | 12/2001 | Owen | |
| 8,175,666 | B2 * | 5/2012 | Harjunmaa | A61B 5/14532 600/310 |
| 10,082,464 | B2 * | 9/2018 | Camargo | G01N 21/0303 |
| 10,408,745 | B2 * | 9/2019 | Degner | G01N 21/31 |
| 2008/0231857 | A1 * | 9/2008 | Depeursinge | A61B 5/14552 356/437 |
| 2012/0006098 | A1 * | 1/2012 | Degner | G01N 21/3504 73/31.05 |
| 2012/0019815 | A1 | 1/2012 | Horikoshi et al. | |
| 2013/0141728 | A1 * | 6/2013 | Alameh | G01N 21/3151 356/445 |
| 2016/0231244 | A1 | 8/2016 | Camargo et al. | |

FOREIGN PATENT DOCUMENTS

| | | |
|---|---|---|
| JP | 08-247935 A | 9/1996 |
| JP | 09-036102 A | 2/1997 |
| JP | 2002-139428 A | 5/2002 |
| JP | 2002-340676 A | 11/2002 |
| JP | 2012-026746 A | 2/2012 |
| JP | 2013-117418 A | 6/2013 |
| JP | 2015-049168 A | 3/2015 |
| KR | 10-0603426 B1 | 7/2006 |
| WO | 1999/036772 A1 | 7/1999 |
| WO | 01/71320 A1 | 9/2001 |
| WO | 2015/045411 A1 | 4/2015 |

OTHER PUBLICATIONS

International Search Report issued in PCT/JP2016/003669; dated Nov. 1, 2016.

* cited by examiner

Time

Fig. 4

Time

Fig. 5

CONCENTRATION MEASUREMENT DEVICE

TECHNICAL FIELD

The present invention relates to a concentration measurement device for measuring gas concentration based on the principle of absorptiometry.

BACKGROUND ART

Traditionally, in this type of concentration measurement device, a light of a predetermined wavelength is incident from a light source into a light incidence window of a measurement cell fed with a fluid to be measured, and the concentration is obtained from an absorbance measured by a light-receiving element receiving transmitted light that has passed through within the measurement cell.

However, in this type of concentration measurement device, measurement error occurs due to deposits derived from the fluid to be measured into the light incidence window, or deterioration of the light source, or the like.

For that reason, a gas concentration measurement device has been proposed, for example, to be capable of supplying a purge gas to an optical system, generating active oxygen for the purge gas, and decomposing dirt that is mainly composed of organic matters before it adheres on the optical system or decomposing and removing the dirt even after it adheres. (Patent document 1, etc.).

PRIOR ART DOCUMENT

Patent Document

Patent document 1: Japanese Unexamined Patent Publication No. 2013-117418

SUMMARY OF THE INVENTION

Problems to be Solved by the Invention

However, the cost of purge-gas supplying equipment is high, and on top of that, equipment for generating active oxygen is more costly. In addition, continuously feeding purge gas before deposits are adhered is also unpreferable in terms of costs. Furthermore, when there are deposits that cannot be eliminated even by using purge gas and active oxygen or in like cases, and when deposits are adhered on the light incidence window, it is more efficient to replace the light incidence window or the measurement cell. Moreover, in the prior art described above, measurement errors caused by the deterioration of the light source cannot be treated.

Therefore, a main object of the present invention is to provide a concentration measurement device that is capable of detecting the adherence of deposits on the light incidence window, and highly accurately measuring concentration without flowing purge gas or the like.

Means for Solving the Problems

In order to achieve the above-mentioned objective, a first aspect of the present invention is a concentration measurement device for measuring the concentration of a fluid to be measured within a measurement cell by detecting transmitted light that has passed through the measurement cell having a light incidence window and a light emission window disposed opposing to each other, comprising a reflected-light detector for detecting reflected light of the light incidence window.

In accordance with the first aspect, a second aspect of the present invention further comprises a notification part for notifying that a detection signal of the reflected light detected by the reflected-light detector has deviated from a predetermined range.

In accordance with the first aspect, a third aspect of the present invention further comprises an arithmetic part for correcting a detection signal of the transmitted light by using the detection signal of the reflected light by the reflected-light detector.

In accordance with the first aspect, a fourth aspect of the present invention further comprises an optical fiber for incident light to guide the light being incident into the light incidence window from a light source, and the reflected-light detector is provided with an optical fiber for reflection measurement to receive and guide the reflected light.

In accordance with the fourth aspect, in a fifth aspect of the present invention, an end portion of the optical fiber for incident light on a side of the light incidence window and an end portion on a light-receiving side of the optical fiber for reflection measurement are disposed adjacent to each other.

In accordance with the first aspect, a sixth aspect of the present invention further comprises a plurality of light sources respectively emitting lights having different wavelengths, and at least one multiplexer for multiplexing the plurality of lights having different wavelengths emitted by the plurality of light sources, wherein a multiplexed-light multiplexed by the multiplexer is incident into the light incidence window.

In accordance with the sixth aspect, a seventh aspect of the present invention further comprises an oscillation circuit device that feeds driving currents of different frequencies to the plurality of the light sources, respectively.

In accordance with the seventh aspect, an eighth aspect of the present invention further comprises an arithmetic part for performing frequency analysis of a detection signal of the transmitted-light detector by using a fast Fourier transform.

In accordance with the seventh aspect, a ninth aspect of the present invention further comprises an arithmetic part for performing frequency analysis of a detection signal of the reflected-light detector by using a fast Fourier transform.

In accordance with the first aspect, in a tenth aspect of the present invention, the light sources of lights being incident into the incidence window include a light source emitting ultraviolet light.

In accordance with the ninth aspect, in an eleventh aspect of the present invention, the arithmetic part computes changes in intensity of the reflected light at each of the different wavelengths from the detection signal of the reflected-light detector.

In accordance with the eleventh aspect, in a twelfth aspect of the present invention, types of surface deposits adhered on the light incidence window are determined on the basis of changes in intensity of the reflected light at each of the wavelengths.

In accordance with the first aspect, a thirteenth aspect of the present invention further comprises an arithmetic part for computing a ratio of intensity of the transmitted light to intensity of the reflected light from a detection signal of the transmitted-light detector and a detection signal of the reflected-light detector.

In accordance with the thirteenth aspect, in a fourteenth aspect of the present invention, the arithmetic part outputs that a rate of change in the ratio of the intensity of the transmitted light to the intensity of the reflected light has deviated from a predetermined range.

Effect of the Invention

According to the present invention, by detecting the reflected light of the light incidence window, the reflected light reflected by the deposits on the inner surface of the measurement cell can be detected, whereby the surface deposits can be detected.

In addition, by notifying that the detection signal of the reflected light has deviated from a predetermined range, the time for maintenance can be known.

Moreover, by correcting the amount of reduction of the transmitted light accompanying the reflected light by using the detection signal of the reflected light by the reflected-light detector, measurement errors caused by the surface deposits can be corrected.

Furthermore, by computing the ratio of the intensity of the transmitted light to the intensity of the reflected light, it is also possible to determine whether a measurement error is caused by the deterioration of the light sources, or caused by the surface deposits, based on the changes in the ratio.

REFERRING TO THE EMBODIMENTS

DESCRIPTION OF THE EMBODIMENTS

An embodiment of the concentration measurement device according to the present invention will be described with reference to FIGS. 1 to 5.

Figure 1:
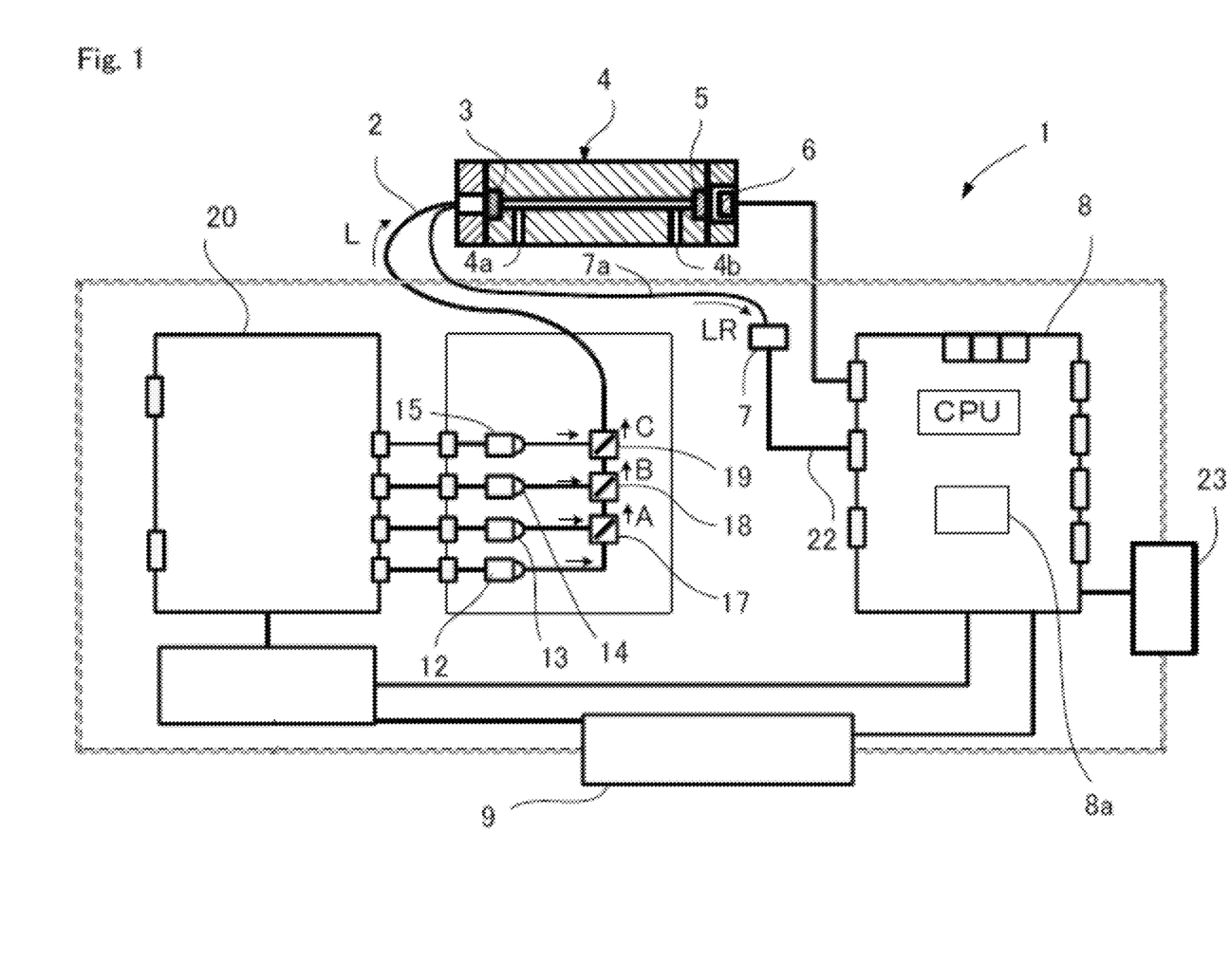
FIG. 1 is a fragmentary cross-sectional view showing the first embodiment of the concentration measurement device according to the present invention.

A concentration measurement device 1 comprises a measurement cell 4 having an inlet 4a and an outlet 4b for a fluid to be measured and a light incidence window 3 and a light emission window 5 disposed opposing to each other; light sources 12 to 15 generating an incident light L to be incident into the measurement cell 4 through the light incidence window 3; a transmitted-light detector 6 detecting transmitted light having passed through the measurement cell 4; a reflected-light detector 7 detecting reflected lights LR from the inside of the measurement cell on the light incidence window 3; and an arithmetic part 8a computing the concentration of the fluid to be measured on the basis of a detection signal of the transmitted-light detector 6.

As material used for the light incidence window 3 and the light emission window 5, sapphire glass that is mechanically and chemically stable and having resistance also to ultraviolet light, or the like, is suitable, but other stable materials such as quartz glass can be also used. The incident light L is guided from the light sources 12 to 15 by an optical fiber for incident light 2, permeates the light incidence window 3, and is incident into the measurement cell 4.

In the example illustrated, the incident light L is a light multiplexed from the lights having a plurality of wavelengths in the ultraviolet region by WDM (Wavelength-Division Multiplexing) multiplexers 17, 18, 19. LEDs are used as the light sources 12 to 15 in the example illustrated. Driving currents of different frequencies are fed to the light sources 12 to 15 respectively by an oscillation circuit device 20. Since the transmitted-light detector 6 and the reflected-light detector 7 cannot detect the difference in wavelengths, driving currents of different frequencies are fed to the respective light sources 12 to 15, whereby LEDs 12 to 15 of different wavelengths can be distinguished from a detection signal detected by the transmitted-light detector 6 and the reflected-light detector 7.

Figure 3:
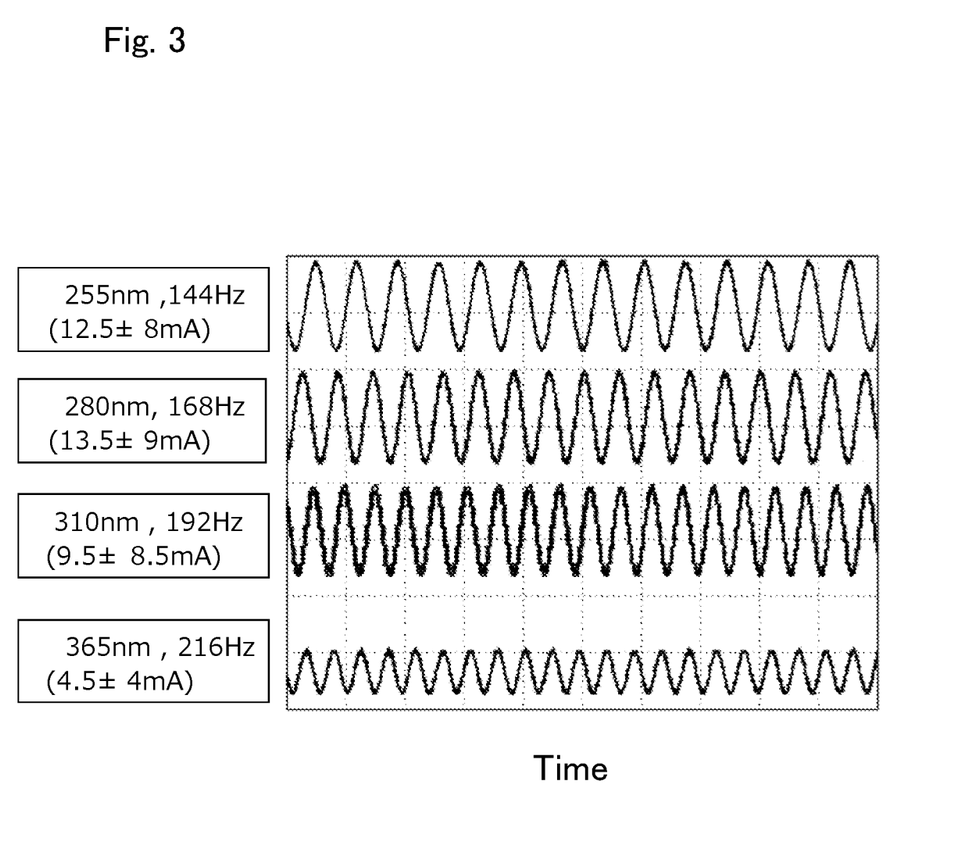
FIG. 3 is a waveform chart showing waveforms of the lights generated when driving currents having different frequencies are fed to a plurality of light-emitting elements having different wavelengths respectively.

In the example illustrated, the wavelength of the light from the light source 12 is 365 nm, the wavelength of the light from the light source 13 is 310 nm, the wavelength of the light from the light source 14 is 280 nm, the wavelength of the light from the light source 15 is 255 nm, the frequency of the driving current fed to the light-source 12 is 216 Hz, the frequency of the driving current fed to the light source 13 is 192 Hz, the frequency of the driving current fed to the light source 14 is 168 Hz, and the frequency of the driving current fed to the light source 15 is 144 Hz. FIG. 3 represents the waveforms of the light sources 12 to 15 respectively.

Figure 4:
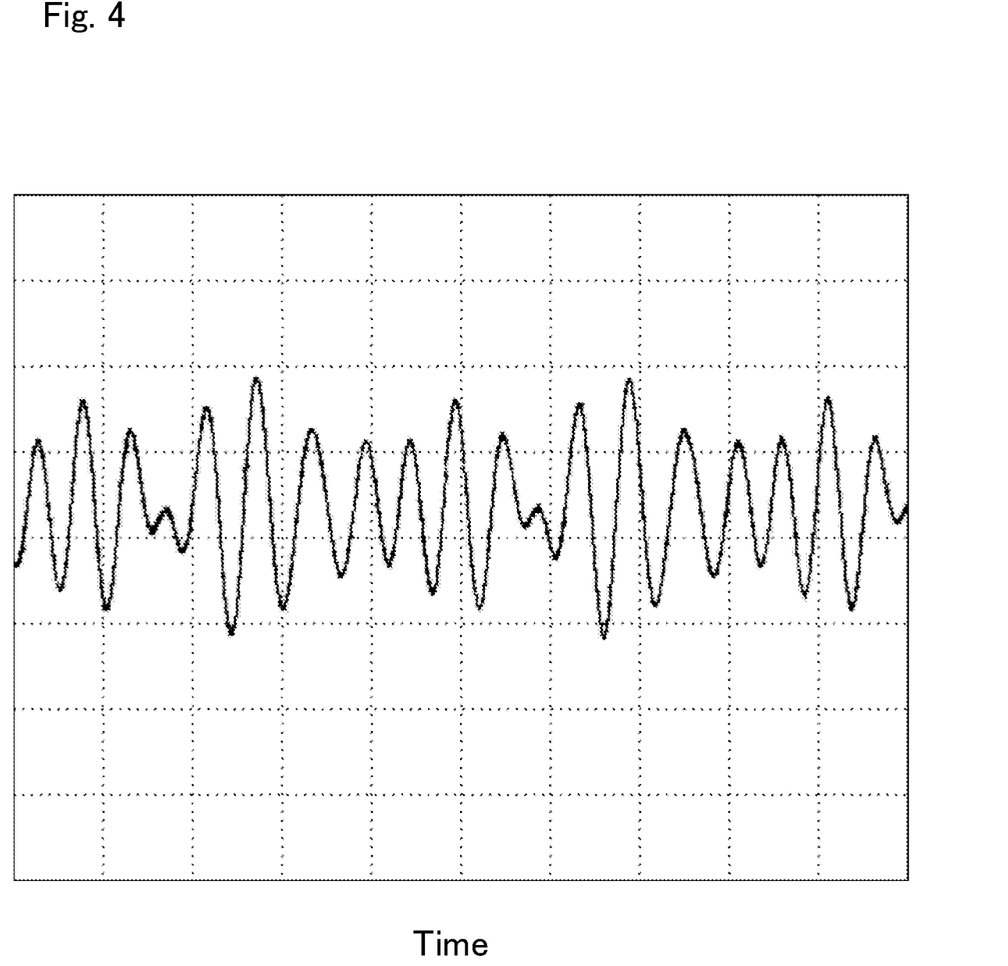
FIG. 4 is a waveform chart showing the waveform of the light in FIG. 3 obtained by multiplexing a plurality of waveforms having different wavelengths by a multiplexer.

The multiplexer 17 multiplexes the light from the light source 12 and the light from the light source 13 to make a multiplexed light A, the multiplexer 18 multiplexes the multiplexed light A and the light from the light source 14 to make a multiplexed light B, the multiplexer 19 multiplexes the multiplexed light B and the light from the light source 15 to make a multiplexed light C. So the multiplexed light C includes four different wavelengths. FIG. 4 shows the waveform of the multiplexed light C detected by a photodiode.

The incident light L made of the multiplexed light C is guided through the optical fiber for incident light 2, permeates the light incidence window 3, and is incident into the measurement cell 4. As the light sources, light-emitting elements other than LEDs, for example, LD (laser diode) can also be used.

The incident light L guided by the optical fiber for incident light 2 is emerged as parallel ray by a collimator lens 21 (FIG. 2), permeates the light incidence window 3, and is incident into the measurement cell 4.

The reflected-light detector 7 comprises an optical fiber for reflection measurement 7a to receive and guide the reflected lights LR reflected by the light incidence window 3. The reflected-light detector 7 uses photodiode, phototransistor and like light sensors as the light-receiving element. When the reflected lights LR are received and radiated, the reflected-light detector 7 outputs a voltage proportional to the radiated level to an arithmetic control unit 8 through an electric wiring 22.

Figure 2:
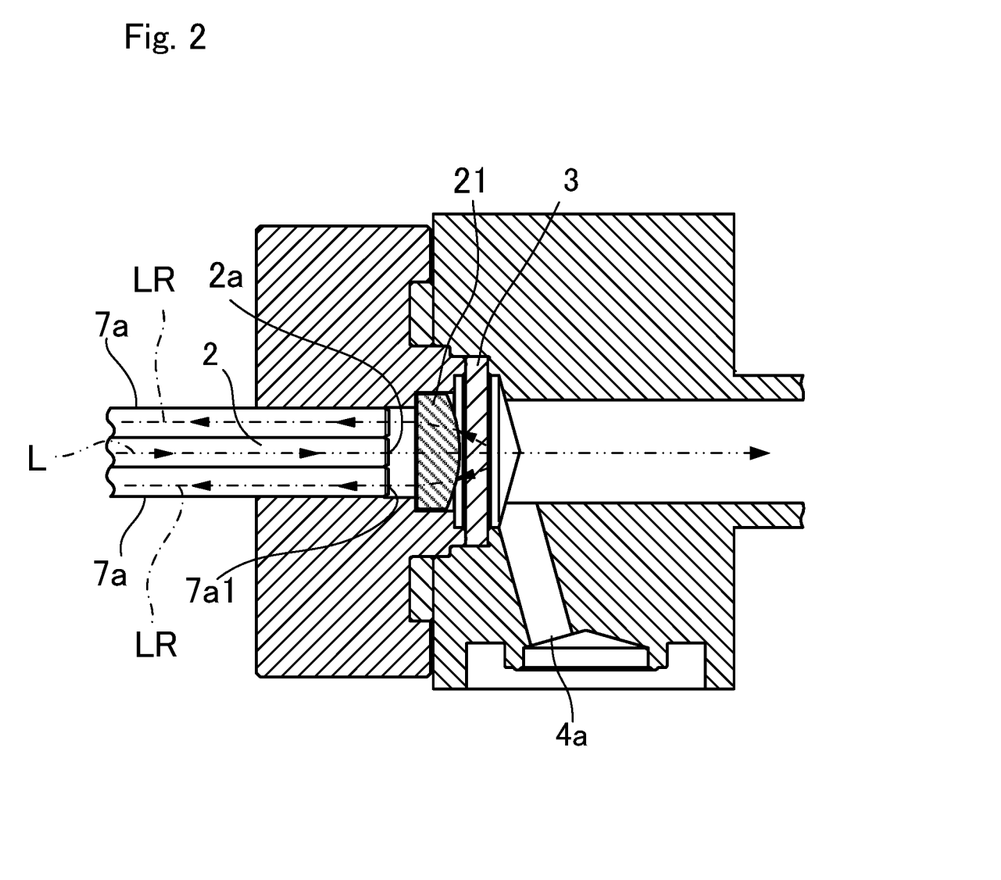
FIG. 2 is a cross-sectional view of an enlargement of the principal part of the concentration measurement device of FIG. 1.

As shown in FIG. 2, an end portion 2a on the side of the light incidence window 3 of the optical fiber for incident light 2 and an end portion 7a1 on the light receiving side of an the optical fiber for the reflection measurement 7a are disposed adjacent to each other, to receive the reflected lights LR efficiently. Only one optical fiber for incident light 2 is shown in the illustrated example, but the number of optical fibers may be 2 or more.

The transmitted-light detector 6 uses a photodiode, phototransistor or like light sensors as the light-receiving element. When the transmitted light L that has passed through the measurement cell 4 is radiated, the transmitted-light detector 6 outputs the voltage proportional to the transmitted light to the arithmetic control unit 8.

In the example illustrated, the light-receiving element of the transmitted-light detector 6 is installed in the measurement cell 4. However, in order to avoid the influence of heat transmitted to the transmitted-light detector 6 from the gas in the measurement cell 4, the transmitted light of the measurement cell 4 can be received by the light-receiving element of the transmitted-light detector 6 disposed in a position apart from the measurement cell 4 via a collimator and an optical fiber (not illustrated) connected to the outside of the light emission window 5 of the measurement cell 4.

In the arithmetic part 8a of the control arithmetic unit 8, based on the absorptiometry, the concentration of the fluid to be measured is calculated from a detection signal of the transmitted light detected by the transmitted-light detector 6. The arithmetic control unit 8 indicates the calculated concentration on a display 9 such as a liquid crystal panel.

Figure 5:
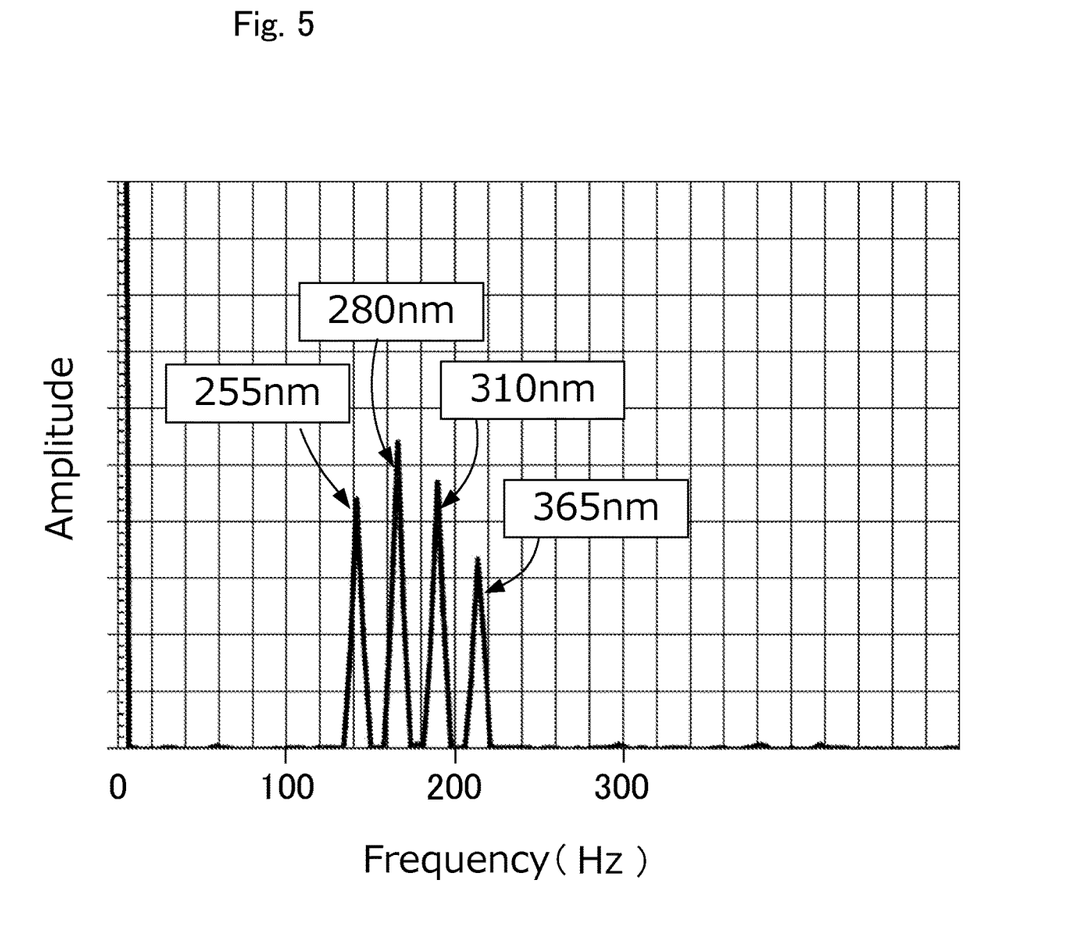
FIG. 5 is a spectrography showing an amplitude spectrum after frequency analysis of the waveform data in FIG. 4 by a fast Fourier transform.

The transmitted-light detector 6 detects the transmitted light after the incident light L obtained by multiplexing a plurality of frequencies has passed through the measurement cell 4. The detection signal of the transmitted light detected by the transmitted-light detector 6 is A/D converted and transmitted as a digital signal to the arithmetic part 8a, subjected to a frequency analysis by the arithmetic part 8a using a fast Fourier transform, and is converted into an amplitude spectrum at each frequency component. FIG. 5 is a spectrography showing the amplitude spectra after the frequency analysis by the fast Fourier transform). In FIG. 5, the frequencies on the horizontal axis represent the frequency of the driving current, while the amplitude on the vertical axis represents the intensity. FIG. 5 shows a state when there is no light absorption (hereinafter referred to as "no-absorption state"), such as a state that no fluid to be measured having light absorption characteristics is fed, or a state that a nitrogen gas with no light absorption is fed. When an organic metal material is fed into the measurement cell 4 as a fluid to be measured in the spectrography of FIG. 5, the frequency amplitude of the wavelength having absorption is decreased.

From the changes in amplitude of the amplitude spectrum of the wavelength having absorption, based on the Lambert-Beer's law, absorbance $A_\lambda$ can be calculated by equation (1) below for determining absorbance $A_\lambda$.

$$A_\lambda = \log_{10}(I_0/I) = \alpha L C \qquad (1)$$

Where $I_0$ is the intensity of the incident light that is incident into the measurement cell, I is the intensity of the transmitted light that has passed through the measurement cell, $\alpha$ is the molar absorptivity (m²/mol), L is the optical path length (m) of the measurement cell, and C is the concentration (mol/m³). The molar absorptivity a is the coefficient determined in a way depending on the substance.

That is, the absorbance $A_\lambda$ can be calculated by considering $(I_0/I)$ in equation (1) above as the change $(P_0/P)$ between the peak value $(P_0)$ of the amplitude at the no-absorption state of the amplitude spectrum shown in FIG. 5 and the peak value (P) of the amplitude at the time of concentration measurement of the amplitude spectrum. Once the absorbance $A_\lambda$ is determined, the concentration C of the fluid to be measured can be calculated from equation (1) above.

The peak value $(P_0)$ of the amplitude at the no-absorption state of the amplitude spectrum can be stored in advance in a memory or the like in the arithmetic control unit 8 for each frequency of the driving current.

The detection signal by the reflected-light detector 7 of the reflected lights LR of the light after being multiplexed is also A/D converted and transmitted as a digital signal to the arithmetic part 8a, subjected to a frequency analysis by the arithmetic part 8a using the fast Fourier transform, and is converted to the amplitude spectra of the respective frequency components. When the amount of deposits derived from the fluid to be measured on the light incidence window 3 increases, the amplitude of the amplitude spectrum changes. The initial value $(S_0)$ of the peak value of the amplitude of the amplitude spectrum is recorded in a memory or the like in the arithmetic control unit 8 for each frequency, and is used for correction of the concentration and the like described later.

A notification part 23 is provided to notify when the detection signal of the reflected lights LR detected by the reflected-light detector 7 deviates from a predetermined range. The predetermined range can be established by experiments or the like in advance, for example, when an output voltage of the reflected-light detector 7 deviated from the predetermined range, the notification part 23 notifies. The notification part 23 can be, for example, an alarm generator which emits an alarm. Alternatively, the notification part 23 can also be an indicator which indicates a warning.

When the value of the detection signal of the reflected lights LR by the reflected-light detector 7 changes, the value of the detection signal of the transmitted-light detector 6 decreases, which causes measurement errors. For that reason, the arithmetic part 8a performs a computation for correcting the detection signal of the transmitted-light detector 6 using the detection signal of the reflected lights LR by the reflected-light detector 7, to enable the correction of the diminution of the transmitted light accompanying the reflected lights LR.

As a correction method, for example, the relationship between the rate of change $(S/S_0)$ of the peak value (S) at the time of the concentration measurement of the amplitude spectrum of the reflected lights LR and the initial value $(S_0)$ described above, and the rate of change $(P/P_0)$ of the initial value of the amplitude spectrum of the transmitted light and the peak value of the concentration measurement value is determined by an experiment or the like in advance, and the rate of change $(P/P_0)$ can be corrected by using the relationship and the rate of change $(S/S_0)$. The corrected concentration can be obtained by the above-mentioned equation (1) using the corrected $(P/P_0)$.

In this embodiment, correction can be made for each of the four wavelengths respectively. Since the absorption spectrum varies depending on the type of gas, more accurate measurement of concentration becomes possible by combining wavelengths with absorptivity and without absorptivity. Depending on the type of gas measured, it is also possible to make corrections for only required wavelengths out of the plurality of wavelengths, but not for each of all wavelengths respectively, for example, for only 2 wavelengths out of 4 wavelengths.

In addition, a temperature detector may be installed in a suitable position because of the temperature dependence of the component device and changes in temperature of the fluid to be measured, so the output value (concentration measurement value) can also be corrected in accordance with the measured temperature.

Since the concentration measurement device having the above-mentioned constitution can detect the reflected lights LR reflected by the deposits on the inner surface of the measurement cell of the light incidence window 3, the diminution in the transmitted light of the light incidence window 3 caused by the surface deposits can be detected.

Moreover, by notifying that a detection signal of the reflected lights LR has deviated from a predetermined range by the reflected-light detector 7 with an alarm, a warning on a liquid crystal or the like, it is possible to know the time for maintenance, such as the replacement of the light incidence window 3.

Furthermore, even if the value of the detection signal of the transmitted-light detector 6 decreases due to the deposits of the light incidence window 3, based on the detection value of the reflected lights LR by the reflected-light detector 7, measurement errors caused by the surface deposits on the light incidence window 3 can be corrected by correcting the diminution of the transmitted light accompanying the reflected lights LR.

The characteristics of the surface deposits on the light incidence window 3 vary depending on their types. For example, some types of deposits can be decomposed and removed by heating the measurement cell, but some other types may firmly be adhered and require the replacement of the light incidence window 3. Since the characteristics of the surface deposits vary depending on their types, so the wavelength dependence of the absorbed light also varies depending on their types. The wavelength dependence in accordance with the type of the surface deposits can be stored as a database in advance by an experiment or the like. The type of the surface deposits can be determined by monitoring the changes in intensity of the reflected lights LR at each of the plurality of different wavelengths. Once the type of the surface deposits is determined, in response to the type, the indication of "heating of the measurement cell", "replacement of light incidence window", or the like can be displayed on the display 9. As described above, the detection signal detected by the reflected-light detector 7 is converted into the amplitude spectrum as shown in FIG. 5, and the changes in amplitude at each respective frequency can be considered as changes in intensity of the reflected light at different wavelengths respectively.

Additionally, in another aspect, the arithmetic part 8a computes the ratio ($I_1/I_2$) of the intensity ($I_1$) of the transmitted light that has passed through the measurement cell 4 to the intensity ($I_2$) of the reflected lights LR of the light incidence window 3 based on the detection signal of the transmitted-light detector 6 and the detection signal of the reflected-light detector 7.

Monitoring the ratio ($I_1/I_2$) makes it possible to determine whether surface deposits are adhered on the light incidence window 3. For example, when the intensity of the reflected lights LR decreases, it may be caused by the surface deposits on the light incidence window 3, or by temporal deterioration of the light sources 12 to 15. When the light sources have temporal deterioration, the ratio of the intensity of the transmitted light to the intensity of the reflected light are not supposed to change. However, when surface deposits are adhered on the light incidence window 3, the ratio of the intensity of the transmitted light to the intensity of the reflected light are supposed to change. Thus, by looking at the changes in the ratio ($I_1/I_2$), it can be determined whether surface deposits are adhered, distinguishing from the deterioration of the light sources.

The arithmetic part 8a is capable of monitoring the rate of the intensity of the transmitted light to the intensity of the reflected light, determining whether the rate of change of the ratio ($I_1/I_2$) is within a predetermined range, and outputting an error signal when the rate deviates from the predetermined range. The error signal can be indicated on the display 9. The error signal can prompt the replacement of the light incidence window 3.

The interpretation of the present invention should not be limited to the above-described embodiment. Various modifications can be made within such a range that does not deviate from the purpose of the present invention. For example, light having wavelength range other than ultraviolet range can also be used as the light for measurement. Additionally, in the above-described embodiment, the multiplexed lights of a plurality of different frequencies are used as the light sources, but a single wavelength light source can also be used. Moreover, in the reflected-light detector 7, it is also possible to install a photodiode in the vicinity of the light incidence window 3 instead of an optical fiber.

DESCRIPTION OF REFERENCE NUMERALS

1 Concentration measurement device
2 Optical fiber for incident light
3 Light incidence window
4a Inlet
4b Outlet
4 Measurement cell
5 Light emission window
6 Transmitted-light detector
7 Reflected-light detector
7a Optical fiber for reflection measurement
8a Arithmetic part
12 to 15 Light sources
20 Oscillation circuit device
23 Notification part

The invention claimed is:

1. A concentration measurement device for measuring the concentration of a fluid within a measurement cell by detecting transmitted light that has passed through the measurement cell, comprising:
    a light incidence window disposed at one side of the measurement cell;
    a light emission window disposed at another side of the measurement cell and opposed to the light incidence window;
    a first optical fiber for guiding incident light from a light source into the light incidence window;
    a collimator lens that collimates the incident light guided by the first optical fiber into a parallel ray and transmits the collimated incident light into the light incidence window;
    a reflected-light detector configured to detect reflected light reflected by surface deposits adhered on the light incidence window comprising a second optical fiber for receiving and guiding the reflected light;
    a transmitted-light detector configured to detect transmitted light through the light emission window; and
    a controller configured to compute a ratio of intensity of the transmitted light to intensity of the reflected light from a detection signal of the transmitted-light detector and a detection signal of the reflected-light detector and determine whether the surface deposits are adhered, distinguishing from deterioration of the light source,
    wherein an end portion of the first optical fiber on a side of the light incidence window and an end portion on a light receiving side of the second optical fiber are disposed adjacent to each other,
    wherein the collimator lens is configured such that the reflected light of the light incidence window is refracted and returned to the second optical fiber, wherein the collimator lens is disposed adjacent to the light incidence window, and wherein the light incidence window is arranged between the collimator lens and the light emission window.

2. The concentration measurement device according to claim 1, further comprising a notifier configured for notifying that a detection signal of the reflected light detected by the reflected-light detector has deviated from a predetermined range.

3. The concentration measurement device according to claim 1, further comprising a controller configured for correcting a detection signal of the transmitted light by using a detection signal of the reflected light by the reflected-light detector.

4. The concentration measurement device according to claim 1, further comprising a plurality of light sources configured to emit lights of different wavelengths respectively, and at least one multiplexer configured for multiplexing the lights of different wavelengths emitted by the plurality of light sources, wherein a multiplexed light multiplexed by the multiplexer is incident into the light incidence window.

5. The concentration measurement device according to claim 4, further comprising an oscillation circuit configured for feeding driving currents of different frequencies to the plurality of light sources respectively.

6. The concentration measurement device according to claim 5, further comprising a controller configured for performing frequency analysis of a detection signal of the transmitted-light detector by using a fast Fourier transform.

7. The concentration measurement device according to claim 5, further comprising a controller configured for performing frequency analysis of a detection signal of the reflected-light detector by using a fast Fourier transform.

8. The concentration measurement device according to claim 1, wherein light sources of lights being incident into the incidence window includes a light source emitting ultraviolet light.

9. The concentration measurement device according to claim 7, wherein the controller is further configured to compute changes in intensity of the reflected light at each of the different wavelengths from the detection signal of the reflected-light detector.

10. The concentration measurement device according to claim 9, wherein the controller is further configured to determine types of the surface deposits adhered on the light incidence window on the basis of changes in intensity of the reflected light at each of the wavelengths and a database on wavelength dependence depending on the type of the surface deposit.

11. The concentration measurement device according to claim 1, wherein the controller is further configured to output that a rate of change in the ratio of the intensity of the transmitted light to the intensity of the reflected light has deviated from a predetermined range.

* * * * *